United States Patent [19]

Slater

[11] 4,386,372
[45] May 31, 1983

[54] OPTICAL MIRROR ADJUSTMENT MEANS FOR A PROJECTION TELEVISION RECEIVER

[75] Inventor: Robert E. Slater, Vernon Hills, Ill.

[73] Assignee: Zenith Radio Corporation, Glenview, Ill.

[21] Appl. No.: 297,885

[22] Filed: Aug. 31, 1981

[51] Int. Cl.³ .............................................. H04N 5/74
[52] U.S. Cl. ..................................... 358/237; 358/60; 358/254
[58] Field of Search ................... 358/60, 63, 237, 238, 358/239, 254; 353/71, 72, 74, 77, 78, 97, 119

[56] References Cited

U.S. PATENT DOCUMENTS

| | | | |
|---|---|---|---|
| 2,476,494 | 7/1949 | Jones et al. | 358/254 |
| 2,497,931 | 2/1950 | Daly | 358/254 |
| 3,804,504 | 4/1974 | Scott | 358/254 |
| 4,281,352 | 7/1981 | Hoffman | 358/237 |

Primary Examiner—Michael A. Masinick

[57] ABSTRACT

Optical mirror adjustment means are disclosed for use in a projection television system having a rear projection viewing screen. The means according to the invention provide for adjusting the reflecting angles of a mirror reflecting an aerial image of a projected television image onto the screen. Pivot means provide for tilting the mirror in elevation, and screw means provide for positionally adjusting and fixing the mirror in a desired elevation angle. Screw means attached to the pivot means provide for positioning and fixing the mirror as azimuthally. The optical mirror adjustment means are such that the mirror can be adjusted to reflect the aerial image in precise coincidence onto the viewing screen.

3 Claims, 12 Drawing Figures

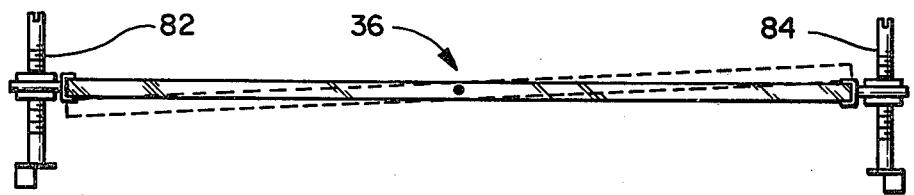
*Fig. 7A*
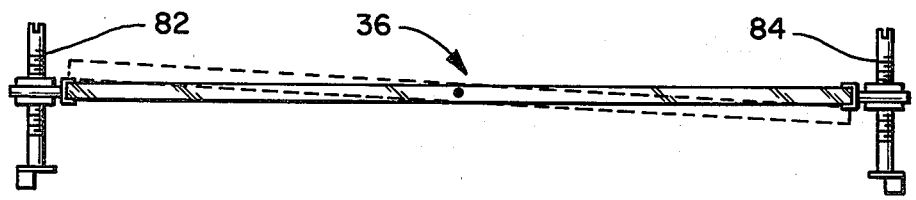
*Fig. 7B*
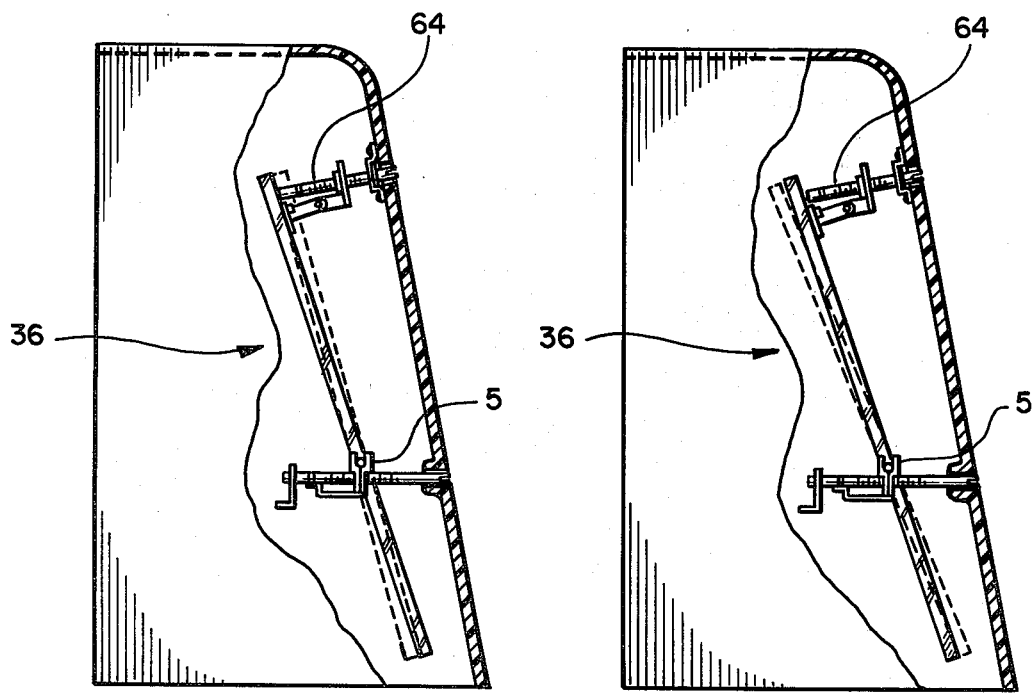
*Fig. 7C*  *Fig. 7D*

OPTICAL MIRROR ADJUSTMENT MEANS FOR A PROJECTION TELEVISION RECEIVER

CROSS-REFERENCE TO RELATED APPLICATIONS

This application is related to but in no way depedent upon copending applications of common ownership herewith including: Ser. No. 228,434 filed Jan. 26, 1981; Ser. No. 259,233 filed Apr. 30, 1981; Ser. No. 314,591 filed Oct. 26, 1981; and Ser. No. 258,206 filed Apr. 27, 1981.

BACKGROUND OF THE INVENTION AND PRIOR ART DISCLOSURES

This invention concerns television systems, and is particularly directed to a system in which a rear projection screen, storable in the system cabinet, is elevatable for viewing.

A system of this type is described and fully claimed in referent copending application Ser. No. 228,434. A jack-in-the-box projection television receiver comprises cabinet means for enclosing the components of the receiver, and includes lid means hinged at the back of the cabinet. The receiver comprises vertically arranged, elevatable rear projection screen means selectively storable in the cabinet. Image source means provides for forming a television image. Stationary projection means provide for projecting an aerial image of a television image formed by the image source means along a folded optical path onto the screen means when the optical path is erected and the screen means is located a predetermined image projection distance from the source means. The receiver further includes means for elevating the screen from a first receiver-inoperable position wherein the screen means is completely enclosed within the cabinet and the receiver is ultra-compact, to an elevated receiver-operable position wherein the screen means is emerged from the cabinet. As a result, the optical path is extended to a length equal to the predetermined image projection distance whereby the projection image is coincident with the screen.

OBJECTS OF THE INVENTION

It is a general object of this invention to provide for improvement in the set-up and servicing means for the optical system of a projection television receiver.

It is a more specific object of the invention to provide improved means for the adjustment of a mirror component of the optical system of a projection television receiver.

BRIEF DESCRIPTION OF THE DRAWINGS

The appended claims set forth those novel features believed characteristic of the invention. However, the invention itself, as well as further objects and advantages thereof, will best be understood by reference to the following detailed description of a preferred embodiment taken in conjunction with the accompanying drawings, in which:

FIGS. 7A–7D show diagramatically the traversal of the mirror when adjusted by the means according to the invention.

DESCRIPTION OF THE PREFERRED EMBODIMENT

Figure 1A:
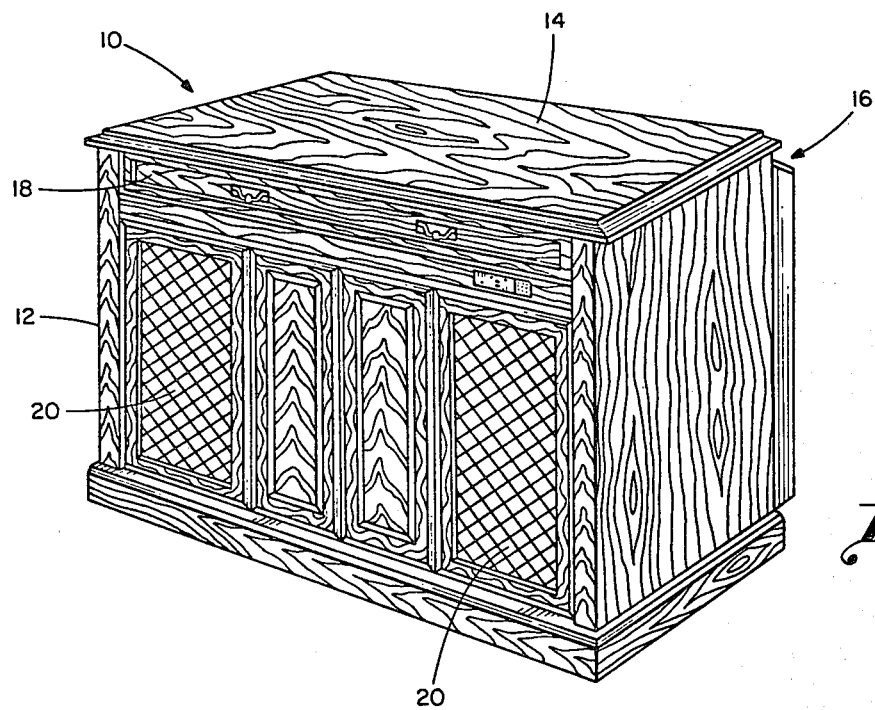
FIGS. 1A and 1B are oblique views in perspective of a projection television receiver according to the invention described and claimed in referent copending application Ser. No. 228,434. There is depicted, respectively, a first, receiver-inoperable position; and a second, receiver-operable position wherein a rear projection screen is elevated from the receiver cabinet for viewing.

An ultra-compact jack-in-the-box projection television receiver 10 according to the invention disclosed in referent copending application Ser. No. 228,434 is shown by FIG. 1A. The receiver comprises cabinet means 12 for housing the components of the receiver. Cabinet 12 includes lid means 14 attached to the back of the cabinet and pivoted by a hinge 16 which may comprise a piano hinge, for example. The lid 14 may have an overhanging control panel cover 18 for covering a receiver control panel. Grilled aperture ports 20 provide for audio emission from concealed speakers of, for example, a stereo sound system.

Figure 1B:
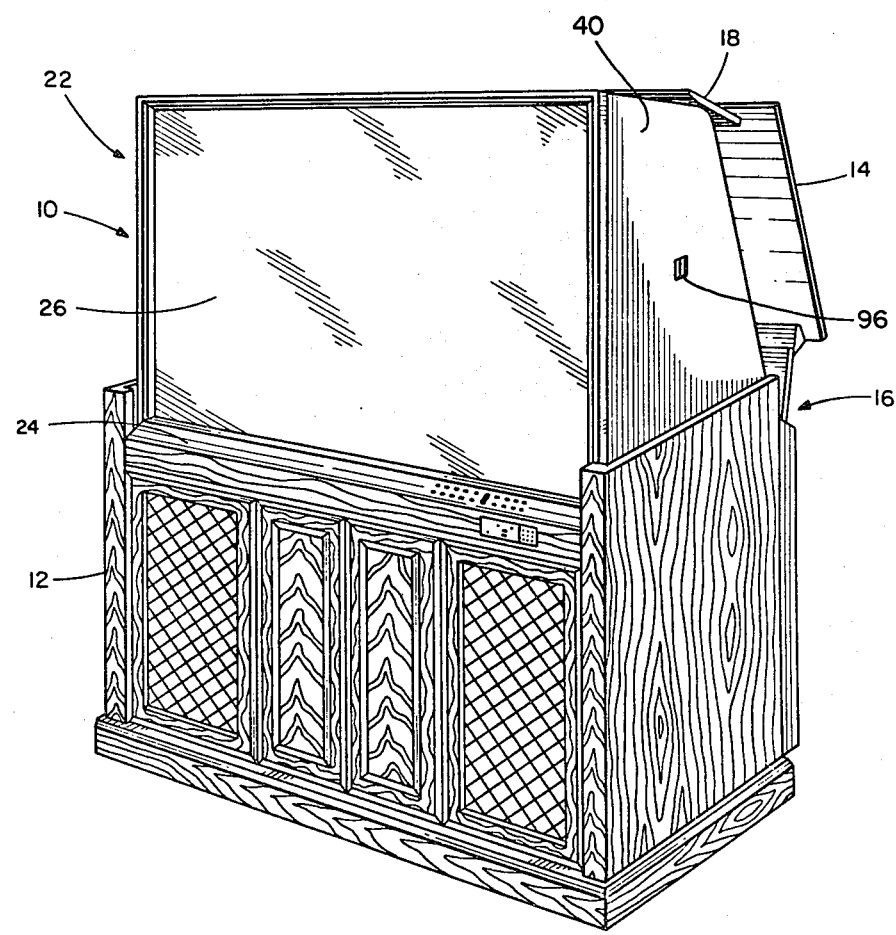

With reference now to FIG 1B, lid 14 is shown as being raised and the unitary optical assembly means 22 according to the invention is shown as being emerged from cabinet means 12. Control panel 24, which may include all standard front panel controls such as controls for channel selection, audio volume, and various chromatic controls, is exposed by the raising of control panel cover means 18 when lid 14 is raised. Control panel cover 18 may be hingedly dependent from lid 14, as indicated. Control panel cover means 18 is described and claimed in referent copending application Ser. No. 259,232.

Figure 2:
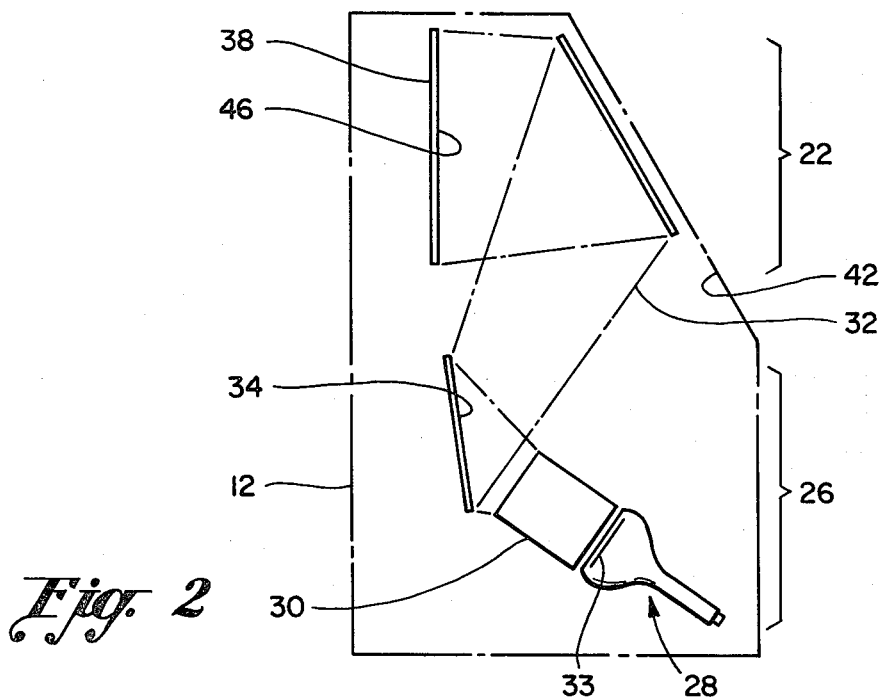
FIG. 2 is a schematic view of the components of the optical path of the receiver in relation to the receiver cabinet depicted as an outline.
Figure 3:
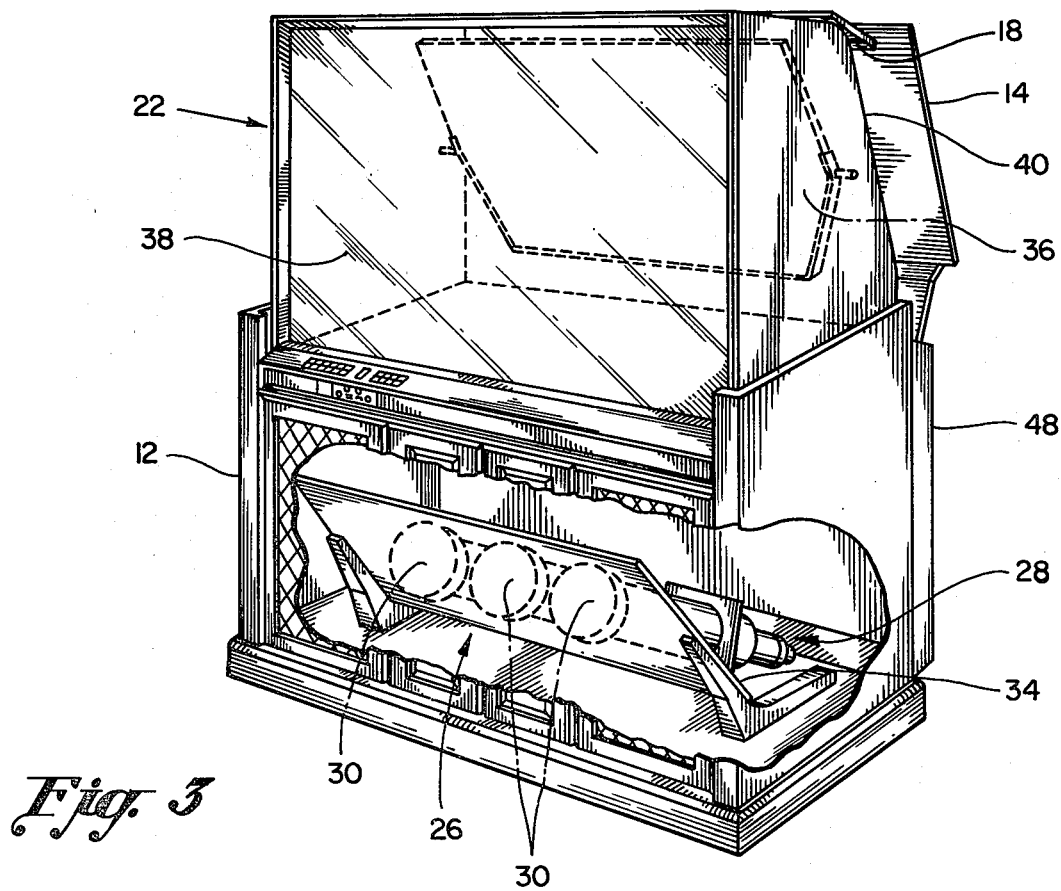
FIG. 3 is an oblique view in perspective depicting a projection television receiver with screen elevated and with the receiver cabinet partially cut away to depict the relationship of major components.

The major components comprising the television receiver 10 are depicted schematically in FIG. 2 and in a cutaway perspective view in FIG. 3. A stationary optical assembly means 26, indicated by a bracket in FIG. 2, is permanently enclosed in a lower portion of cabinet 12 as indicated. Stationary optical assembly 26 includes a television image source means for forming a television image. The television image source means is indicated as comprising three cathode ray tubes 28 which may form, respectively, a red, green or blue image for projecting in conjunction with associated projection lenses 30, and when the unitary optical assembly is elevated, an aerial image of the television image upwardly a predetermined projection image distance along an optical path 32 folded by optical path folding means. A television image 33 is depicted schematically in FIG. 2 as being formed on the cathodoluminescent screen of one of the cathode ray tubes. The stationary optical assembly 26 includes a first mirror means 34, which provides for receiving the aerial image and reflecting the image upwardly. The stationary optical assembly 26 is fully described and claimed in referent copending application Ser. No. 314,591.

Figure 4:
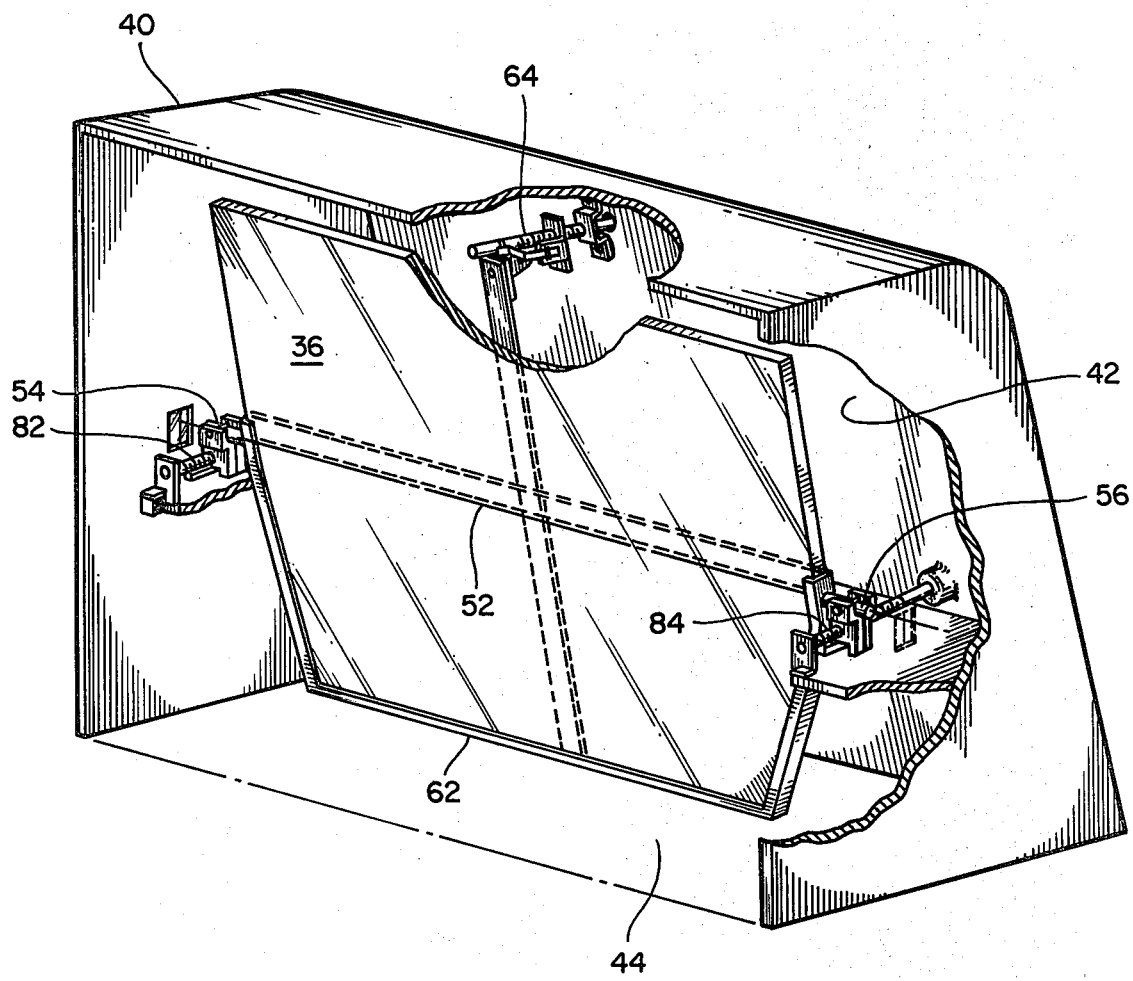
FIG. 4 is a front oblique, partly cut away view of an optical mirror and associated means for support and adjustment according to the invention.

The unitary optical assembly means is selectively storable in cabinet 12, and elevatable therefrom. The unitary optical assembly 22 comprises the following components, in combination. Mirror means 36, (a "second" mirror means), is arranged at a predetermined angle effective to receive the aforedescribed aerial image 32, and reflect the image forwardly. Rear projection screen means 38 is located at the terminus of the optical path 32. Screen means 38 is shown as being vertically arranged for receiving the aerial image reflected by mirror 36, and displaying the image. The unitary optical assembly 22 further includes rigid, box-like shroud means 40, which has an open front for receiving screen 38, as depicted (please refer also to FIG. 4). Shroud 40 includes an inner back section 42 slanted at the predetermined angle of mirror 36 for spacedly receiving and mounting mirror 36 at the predetermined angle and in a predetermined fixed, yet in finely adjustable relation to screen 38. Shroud 40 includes an open bottom area 44 for access of optical path 32. Shroud 40 is also depicted as having closed sides and a closed top for shielding mirror 36 and the inner surface 46 of screen 38 from ambient light. The shroud 40 is preferably made of high-impact polystyrene formed in a pressure mold. The material is essentially a "structural foam" that provides strength and rigidly with light weight.

The unitary optical assembly provides, by means of shroud 40, for maintaining mirror 36 and screen 38 in a predetermined fixed relationship one with the other. Further, when the unitary optical assembly 22 is elevated, shroud 40 provides for establishing and maintaining mirror 36 and screen in predetermined fixed relationship with the stationary optical assembly 26.

FIG. 1A depicts the location of the unitary optical assembly when the receiver is in a first, receiver-inoperable position wherein the unitary optical assembly 22 is stored in cabinet 12. When the unitary optical assembly 22 is in this position, receiver 10 is substantially as compact as a conventional large-screen console television receiver. Means are provided for lifting lid 14 and unitary optical assembly 22 including associated screen 38 to a second elevated receiver-operable position wherein screen 38 is emerged from cabinet 12; this configuration is depicted in FIGS. 1B and 3. When screen 38 is in the receiver-operable position, the receiver 10 is capable of displaying an image with an area greater than three times the image area of a conventional television receiver.

When unitary optical assembly 22 is fully emerged from cabinet 12, the length of the folded optical path 32 is equal to the aforedescribed projection distance, and the projected image is coincident with screen 38. The protractible and retractible optical system is fully described and claimed in referent copending application Ser. No. 258,206. Cabinet extension 48 provides additional space for enclosing shroud 40 when unitary optical assembly 22 according to the invention is stored in cabinet 12. Precision elevating means (not shown) provide for elevating and lowering the unitary optical assembly 22 from and into cabinet 12.

With reference to FIGS. 4-7D, there is shown the components of the optical mirror adjustment means according to the invention. Mirror 36 is depicted as being substantially rectangular and having a horizontally oriented major axis 52. Pivot means 54 and 56 are indicated as being located at opposite ends of mirror 36, and parallel with major axis 52 of mirror 36 for tilting mirror 36 in elevation.

Figure 5:
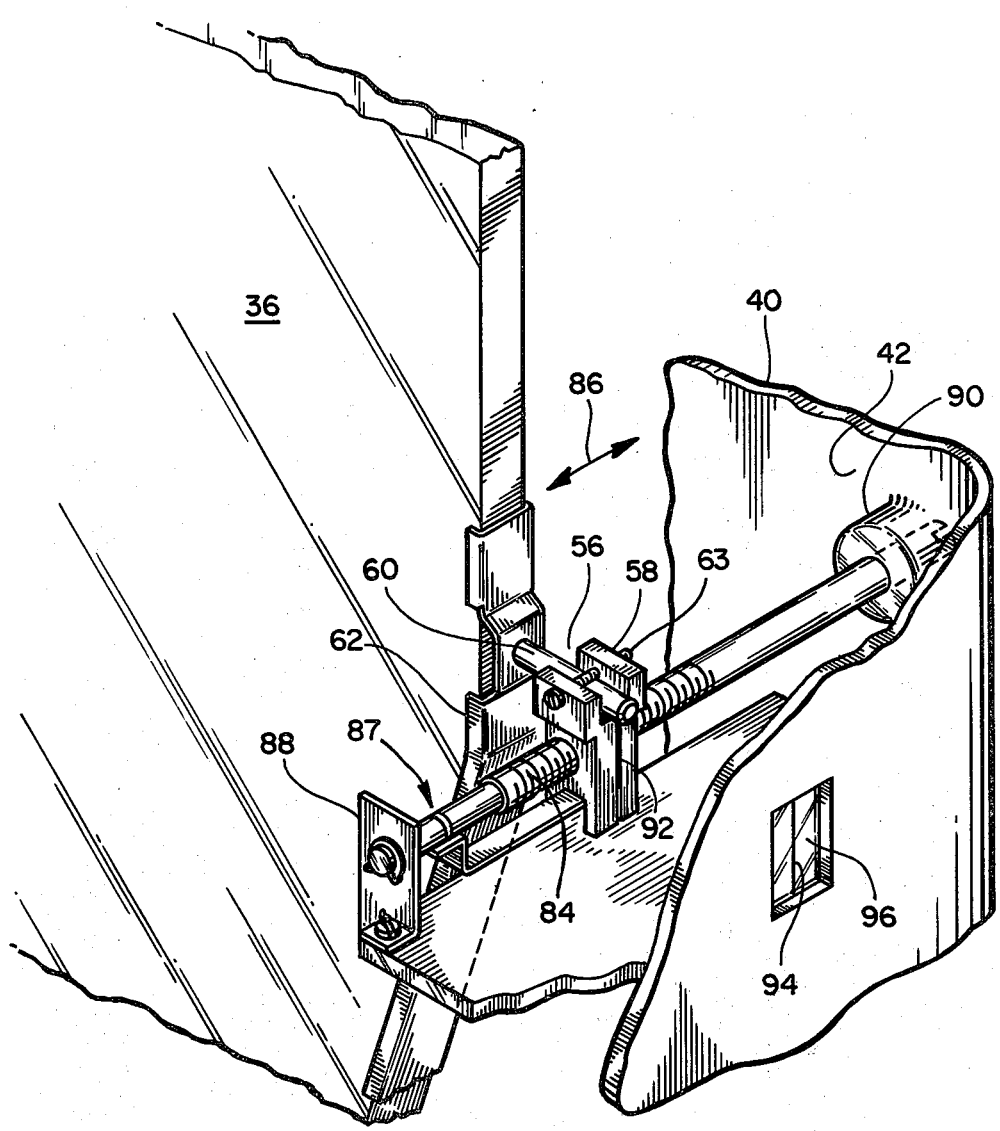
FIG. 5 is a detail view in perspective of a component shown by FIG. 4 depicting a preferred means for mirror adjustment according to the invention.

With reference now to FIG. 5 wherein pivot means 56 is shown in detail, pivot means 56 is indicated as comprising a cradle 58 for receiving a pin 60. Pin 60 is depicted as being attached to a frame 62 which receives and encloses mirror 36. Threaded pin retention member 63 provides for holding pin 60 in cradle 58.

Figure 6A:
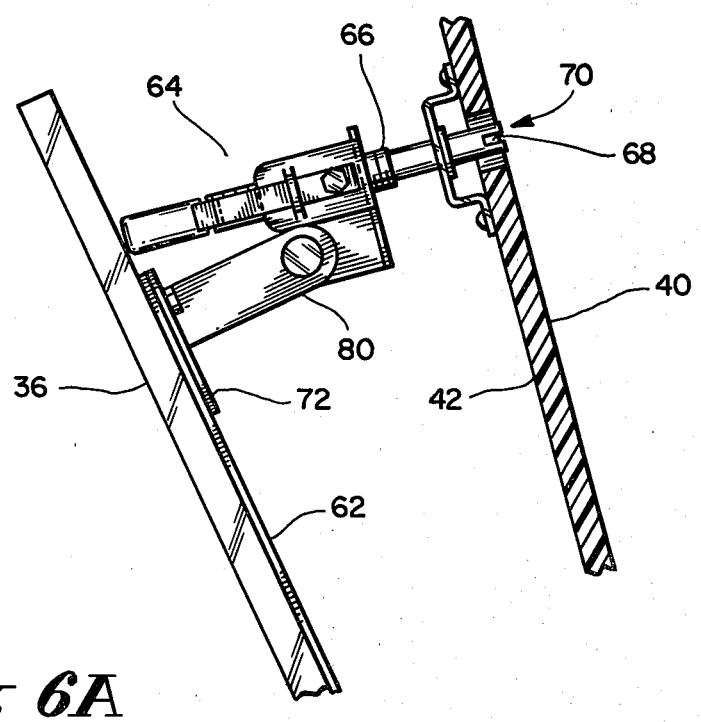
FIG. 6A is a detail plan view, and FIG. 6B a perspective view, showing further details of mirror adjustment means according to the invention.

As shown by the detail view, FIG. 6A, screw means 64 provides for coupling mirror 36 and the inner back section 42 of shroud 40. As screw member 66 is rotated, mirror 36 is tilted on pivot means 54 and 56 to a desired elevational angle. Screw member 66 is indicated as having a slot 68 for receiving a screwdriver blade (not shown) for which access is provided in shroud 40 by means of aperture 70.

Figure 6B:
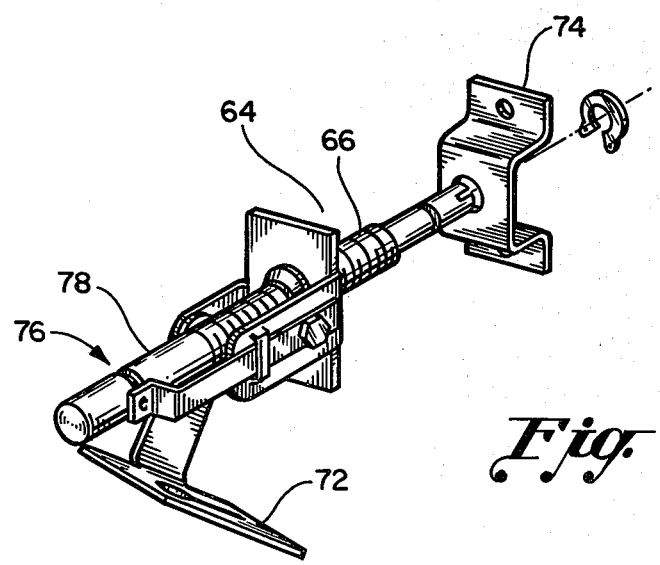

Screw means 64, shown in greater detail in FIG. 6B, is depicted as having a pivoting bracket 72 for attachment to frame 62 of mirror 36, and a U-bracket 74 for attachment to the inner surface 42 of shroud 40, as by bolt means (not indicated). Indent-detent means 76 provides for establishing the central position of the shaft 78 of the screw means 66 in relation to pivotal member 80.

Screw means 82 and 84 (see FIG. 4) provide for coupling, respectively, pivot means 54 and 56 to shroud 40. As indicated in FIG. 5, wherein pivot means 56 and screw means 84 with attaching parts are shown in greater detail, rotation of screw means 84 in either a clockwise or a counterclockwise direction will result in movement of the mirror in the directions indicated by the associated arrow 86. Screw means 84 can be rotated by a screwdriver blade inserted in a slot in the end of the unthreaded shaft of screw means 84. The indent-detent means 87 indicated provide for establishing a central reference position for adjustive rotation of screw means 84. By the means described, mirror 36 can be positionally adjusted and fixed azimuthally.

Mirror 36 is supported mainly by pivot means 54 and 56 and associated screw means 82 and 84. How the mirror is supported is indicated by the example of pivot means 54 shown by FIG. 5. A bracket 88 is depicted as supporting, and providing a bearing surface, for the forward end of an unthreaded section of screw means 84. Screw means 84 is supported at the opposite end by a boss 90 molded in shroud 40 and having an aperture therethrough to provide a bearing for the shaft, as depicted.

The relative movements of mirror 36 in azimuth and elevation are indicated by FIGS. 7A-D. FIGS. 7A and 7B, for example, indicate the azimuthal traverse of mirror 36 in response to the adjustive rotation of screw means 82 and 84. FIGS. 7C and 7D indicate the elevational traverse of mirror 36 in response to the adjustive rotation of screw member 66 of screw means 64.

Indexing means are provided to facilitate azimuthal adjustment of mirror 36. Referring to FIG. 5, a vertical index line 92 is indicated on the outer surface of cradle 58. A corresponding index line 94 is depicted in vertical orientation on a glass window 96 located in the side of shroud 40. Adjustment of the mirror 36 in azimuth is facilitated by visually comparing the relative positions of lines 92 and 94.

The optical mirror adjustment means according to the invention are such that mirror 36 can be fixedly adjusted to reflect the projected television image in precise coincidence on viewing screen 38. A major benefit lies in the fact that the mirror can be adjusted from outside the shroud without extensive disassembly of the receiver.

While a particular embodiment of the invention has been shown and described, it will be obvious to those skilled in the art that changes and modifications may be made without departing from the invention in is broader aspects and, therefore, the aim in the appended claims is to cover all such changes and modifications as fall within the true spirit and scope of the invention.

I claim:

1. For use in a projection television system having a rear projection viewing screen, mirror adjustment means for adjusting the reflection angles of a mirror included in a folded optical path, said mirror disposed within a housing and facing an open side of said housing said open side being closed by said screen, said mirror having a major horizontal axis established in the vicinity of the central portion of said mirror, said mirror serving to reflect an aerial image of a projected television image onto said screen, said mirror adjustment means disposed within said housing and comprising:

pivot means, located at opposite sides of said mirror along said major horizontal axis and supporting said mirror for rotation about said axis to permit tilting of said mirror in elevation, exteriorly accessible first screw means, coupled to said mirror for rotating said mirror upon said pivot means about said horizontal axis for positionally adjusting and fixing said mirror in a desired elevation angle;

exteriorly accessible second screw means coupled to said pivot means for displacing said pivot means to rotate said mirror about an axis orthogonal to said major horizontal axis to positionally adjust and fix said mirror azimuthally;

such that said mirror can be adjusted, without opening said housing, to reflect said aerial image along said optical path into precise coincidence with said viewing screen.

2. The mirror adjustment means according to claim 1 wherein said pivot means comprises indexing means for indicating the azumuthal adjustment of said mirror.

3. Optical mirror adjustment means for use in an ultra-compact projection television receiver housed in a cabinet, said receiver including:

stationary optical assembly means permanently enclosed in a lower portion of said cabinet for forming a television image and projecting an aerial image of said television image steeply upwardly a predetermined image projection distance along an optical path folded by optical path folding means;

unitary optical assembly means selectively storable in said cabinet and elevatable therefrom, said unitary optical assembly means including:

substantially rectangular optical mirror means, having a horizontally-oriented major axis established in the vicinity of the central portion of said mirror, for receiving and reflecting said image forwardly;

rear projection screen means located at the terminus of said optical path and vertically arranged for receiving and displaying said aerial image reflected by said mirror means;

rigid, box-like shroud means having an open front for receiving and mounting said screen means, and including a slanted inner back section for spacedly receiving and mounting said mirror means, said shroud means including an open bottom area for access of said optical path, and a top and two sides for shielding said mirror and the rear surface of said screen from ambient light;

said optical mirror adjustment means comprising:

pivot means located at opposite sides of said mirror along said major horizontal axis and supporting said mirror for rotation about said major axis of said mirror to permit tilting said mirror in elevation;

first screw means coupling said mirror to said inner back section of said shroud means and having exteriorly accessible adjustment means for tilting and fixing said mirror in a desired elevational angle;

second screw means coupling said pivot means to said shroud means and having exteriorly accessible adjustment means for positionally adjusting and fixing said mirror azimuthally;

indexing means for indicating azimuthal adjustment of said mirror;

such that said mirror can be fixedly adjusted to reflect said aerial image in precise coincidence on said viewing screen.

* * * * *